UNITED STATES PATENT OFFICE.

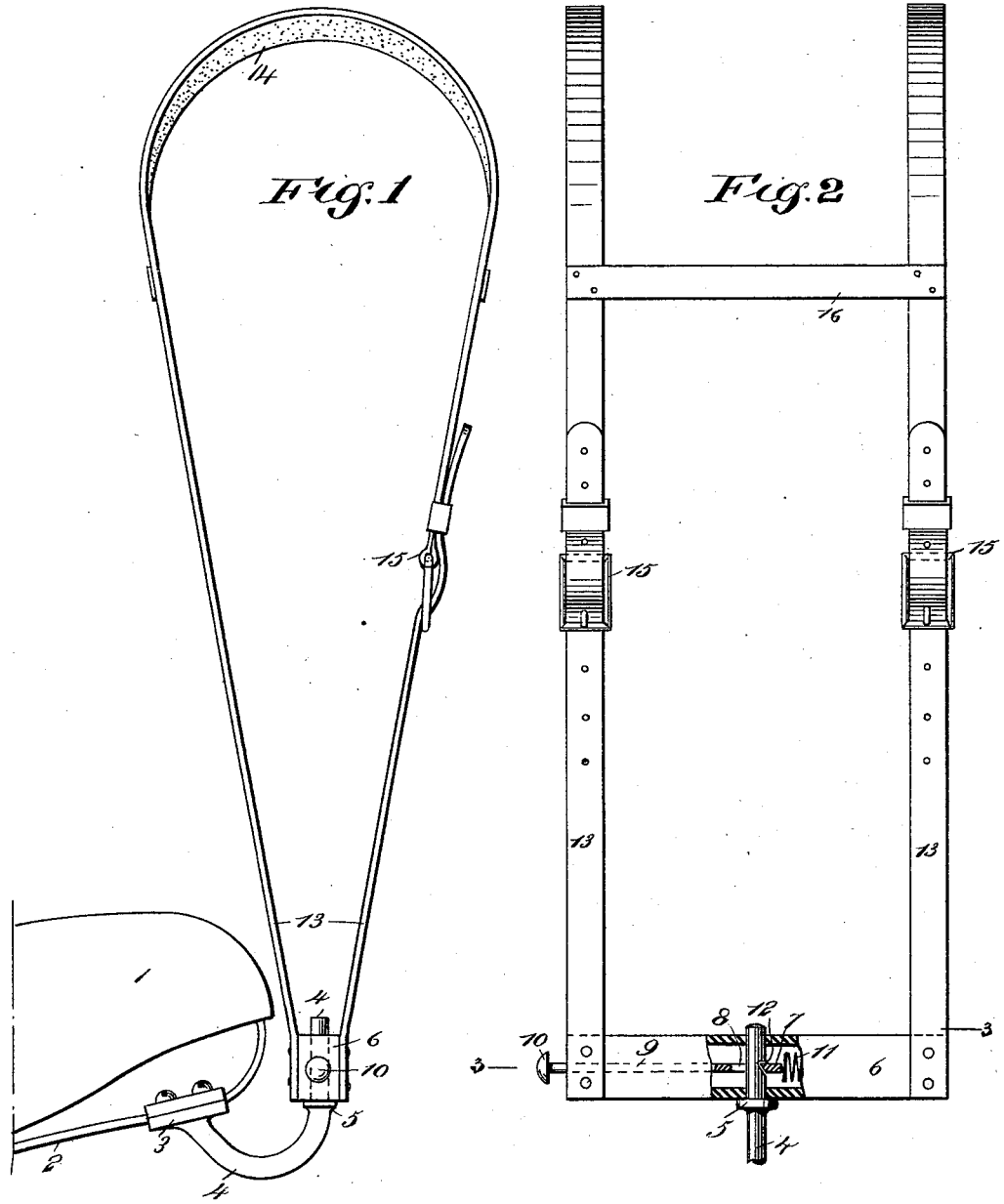

ESTANISLAO CABALLERO DE LOS OLIVOS, OF NEW YORK, N. Y.

BICYCLE SHOULDER-BRACE.

SPECIFICATION forming part of Letters Patent No. 539,702, dated May 21, 1895.

Application filed January 3, 1895. Serial No. 533,769. (No model.)

*To all whom it may concern:*

Be it known that I, ESTANISLAO CABALLERO DE LOS OLIVOS, a citizen of the Republic of Mexico, and a resident of New York city, in the county and State of New York, have invented a new and Improved Bicycle Shoulder-Brace, of which the following is a specific description.

My invention relates to a device enabling a bicycle rider to propel his machine with increased power, by attaching to the cycle a support affording a resistance above the shoulders of the operator.

The object of my invention is to provide a support or brace of the above indicated class which will be detachably connected with the machine, so that in case of an emergency the rider can readily dismount.

Other objects of the invention will appear from the description following hereinafter.

The invention consists of certain features of construction, and combinations of parts, that will be hereinafter particularly described and pointed out in the appended claims.

Reference is to be had to the accompanying drawings, in which—

Figure 1 is a side elevation showing my improved shoulder-brace attached to the front end of the saddle of a bicycle. Fig. 2 is a broken front elevation of the improvement with parts in section, and Fig. 3 is a broken sectional plan taken essentially on the line 3 3 of Fig. 2.

Like numerals indicate like parts in all the views.

1 designates the saddle of the bicycle, and 2 the saddle frame. To the front end of said frame is secured by means of a clip 3 or other fastening device, a curved rod 4 whose free end is vertical or approximately so. The rod 4 forms a support for the shoulder brace, which is adapted to rest on a collar 5 produced on the rod 4.

The shoulder brace consists of a transverse bar 6 provided with apertures for the passage of the rod 4. Within a recess of the bar 6 is placed a slide 7 having an elongated aperture 8 through which the supporting rod 4 is adapted to project. The slide is connected to a rod 9 protruding from the bar 6 and provided with a button 10 to permit the slide to be actuated by the rider of the bicycle. A spring 11 normally keeps the slide 7 and rod 9 in an outward position, and when the bar 6 is in position upon the rod 4, serves to hold one side of the aperture 8 in engagement with a notch 12 of the supporting rod 4, thereby preventing separation of the shoulder brace from the support. To the ends of the bar 6 are secured shoulder straps 13, preferably provided with pads 14, and with buckle connections 15 whereby their length may be adjusted according to the stature of the rider. The straps 13 may be connected by a transverse strap or brace 16.

It will be understood that the straps 13 afford a resistance or fulcrum above the shoulders of the rider and thus enable him to exert a considerably greater downward pressure with his feet than when no shoulder brace is employed. Should the rider desire to dismount quickly, it will be sufficient for him to press the button 10, thereby disengaging the slide 7 from the supporting rod 4, and the upward strain on the straps 13 will cause the bar 6 to come off the support 4, so that the rider is entirely free to jump off the machine. This feature I consider an important advantage of my invention.

By making the free end of the support 4 vertical or approximately so, the bar 6 will be enabled to readily slide off the support when the rider presses the button 10.

When the support 4 is secured directly to the saddle frame, as shown in Fig. 1, I secure the further advantage that vibrations of the saddle relatively to the frame of the bicycle will not affect the position of the shoulder brace relatively to the rider's body, as they would if the support 4 were secured directly to the frame of the bicycle. I am aware, however, that with some types of saddles it will be difficult to secure the support 4 directly to the saddle frame, and I reserve the right of securing said support to any part of the bicycle, as in any event the advantage accruing from the ready detachability of the shoulder brace would be preserved.

Yokes or other supports may be substituted for the straps 13.

Other modifications may be made without departing from the nature of my invention as defined in the claims.

Having thus fully described my invention,

I claim as new and desire to secure by Letters Patent—

1. The combination of the support secured to the cycle and having its free end arranged to face upward, the shoulder brace detachably connected to the said support and mounted to move upward on the free end of the same to disengage the shoulder brace from its support, and a locking device under the control of the rider, for normally preventing separation of the shoulder brace from its support, substantially as described.

2. The combination of the support secued to the cycle and having its free end arranged to face upward, the transverse bar detachably connected to the support and mounted to slide vertically on the free end thereof to disengage the bar from the support, a locking device under the control of the rider, for normally preventing separation of the bar from the support, and shoulder straps secured to the bar on opposite sides of the support, substantially as described.

ESTANISLAO CABALLERO DE LOS OLIVOS.

Witnesses:
JOHN LOTKA,
JNO. M. RITTER.